(12) United States Patent
Aoki et al.

(10) Patent No.: US 8,068,130 B2
(45) Date of Patent: Nov. 29, 2011

(54) DISPLAY PANEL AND DISPLAY APPARATUS

(75) Inventors: Sunao Aoki, Matsusaka (JP); Tatsuji Saitoh, Kobe (JP); Kenji Fujita, Taki-gun (JP); Toshihiro Matsumoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1664 days.

(21) Appl. No.: 10/571,063

(22) PCT Filed: Nov. 4, 2004

(86) PCT No.: PCT/JP2004/016327
§ 371 (c)(1),
(2), (4) Date: Mar. 8, 2006

(87) PCT Pub. No.: WO2005/054930
PCT Pub. Date: Jun. 16, 2005

(65) Prior Publication Data
US 2006/0284972 A1    Dec. 21, 2006

(30) Foreign Application Priority Data
Dec. 5, 2003 (JP) .................................. 2003-408090

(51) Int. Cl.
*H04N 15/00* (2006.01)
*H04N 13/04* (2006.01)

(52) U.S. Cl. ....... 348/51; 345/4; 345/5; 345/6; 349/139; 349/140; 349/141; 349/142; 349/143; 349/144

(58) Field of Classification Search .................. 345/4–6, 345/32
See application file for complete search history.

(56) References Cited

U.S. PATENT DOCUMENTS

| | | | |
|---|---|---|---|
| 5,600,461 A * | 2/1997 | Ueda et al. ...................... | 349/38 |
| 6,040,814 A * | 3/2000 | Murakami et al. .............. | 345/94 |
| 6,195,140 B1 | 2/2001 | Kubo et al. | |
| 6,611,243 B1 | 8/2003 | Moseley et al. | |
| 7,098,069 B2 * | 8/2006 | Yamazaki et al. .............. | 438/99 |
| 7,113,158 B1 * | 9/2006 | Fujiwara et al. ................ | 345/87 |
| 7,123,417 B2 * | 10/2006 | Ishikawa et al. .............. | 359/618 |
| 7,304,703 B1 * | 12/2007 | Takeda et al. ................. | 349/129 |
| 7,446,733 B1 * | 11/2008 | Hirimai .......................... | 345/32 |
| 7,466,733 B2 * | 12/2008 | Nishida ..................... | 372/38.05 |
| 2002/0000977 A1 * | 1/2002 | Vranish ....................... | 345/173 |
| 2003/0052836 A1 | 3/2003 | Matsumoto et al. | |
| 2007/0152934 A1 * | 7/2007 | Maeda ............................ | 345/92 |

FOREIGN PATENT DOCUMENTS

| | | |
|---|---|---|
| JP | 6-167688 A | 6/1994 |
| JP | 9-258268 A | 10/1997 |
| JP | 10-274786 A | 10/1998 |
| JP | 11-101992 A | 4/1999 |
| JP | 2001-13494 A | 1/2001 |
| JP | 2002-514788 A | 5/2002 |
| JP | 2002-244079 A | 8/2002 |
| JP | 2003-140127 A | 5/2003 |
| JP | 2003-161912 A | 6/2003 |
| JP | 2003-255265 A | 9/2003 |
| JP | 2003-295113 A | 10/2003 |

\* cited by examiner

*Primary Examiner* — Richard Hjerpe
*Assistant Examiner* — Jeffrey Steinberg
(74) *Attorney, Agent, or Firm* — Nixon & Vanderhye, P.C.

(57) ABSTRACT

An active matrix type display panel, used as a display-use panel, has pixel patterns each having aperture sections. The aperture sections are set to have a width satisfying the following inequality, 0<(minimum width of the aperture sections in the pixel)/(maximum width of the aperture sections in the pixel)≦0.037, or 0.130≦(minimum width of the aperture sections in the pixel)/(maximum width of the aperture sections in the pixel)<1.

14 Claims, 9 Drawing Sheets

■ LIGHT-SHIELDING REGION
☐ LIGHT-TRANSMITTING REGION
▨ RIGHT EYE IMAGE
▧ LEFT EYE IMAGE

US 8,068,130 B2

DISPLAY PANEL AND DISPLAY APPARATUS

This application is the US national phase of international application PCT/JP2004/016327, filed 4 Nov. 2004, which designated the U.S. and claims priority of JP 2004-408090, filed 5 Dec. 2003, the entire contents of each of which are hereby incorporated by reference.

TECHNICAL FIELD

The present invention relates to a display panel and a display apparatus which are capable of displaying different images according to a plurality of viewpoints in a similar manner to 3D (three dimensional) display.

BACKGROUND ART

In a normal field of vision, humans have two eyes that perceive images which the eyes view from two different viewpoints, respectively, due to their spatial separation of the eyes in the head. Parallax of the two images allows the humans brain to recognize the images from the two different viewpoints as a stereoscopic image. By utilizing this principle, there has been developed a liquid crystal display which causes an observer to view and recognize images from two different viewpoints through the right eye and the left eye, respectively, so as to generate parallax, thereby providing a 3D (three-dimensional) display.

In a conventional 3D liquid crystal display, images from respective different viewpoints are supplied to the right and left eyes of the observer, by first encoding the left eye image and right eye image on a display screen according to e.g. color, polarization state, or display time, and then separating these images through a filter system of glasses worn by the observer. The filter system allows the left eye image and the right eye image which have been separated to be supplied to the left eye and the right eye of the observer, respectively.

In another liquid crystal display, as illustrated in FIG. 8(a), a display panel 101 is combined with a parallax barrier 102 having light-transmitting regions and light-shielding regions arranged in a stripe pattern. This allows an observer to recognize a 3D image without using a visual assistance such as a filtering system (autostereoscopic display). Specifically, a parallax barrier 102 gives specific viewing angles to a right eye image and a left eye image generated by the display panel 101. When viewed in a specific spatial viewing region, the right eye image and the left eye image are viewed and recognized by the right eye and the left eye, respectively, so that a 3D image is recognized by the observer (see FIG. 8(b)).

Further, by employing the same technique used in the 3D display, it is possible to realize a display apparatus in which, when a single display screen image is viewed from different directions, i.e., the left and right directions, different images are displayed on the display screen for the respective directions in which the display screen image is viewed and recognized. Specifically, by displaying images separated by a parallax barrier as different individual images, not as the right eye image and the left eye image in a 3D display, it is possible to supply different images to a plurality of observers who view the single display image from the left and right directions.

Japanese Unexamined Patent Publication, No. 110495/1996 (Tokukaihei 8-110495, publication date: Apr. 30, 1996) describes a crosstalk issue in a 3D display apparatus employing a liquid crystal panel and a parallax barrier. That is, this publication discloses that, according to a 3D display apparatus, a stereoscopic vision cannot be realized, because there is a region where both of a right eye image and a left eye image are observed by a single eye. Such overlapping of the right eye image and the left eye image is called as crosstalk.

However, according to the publication Tokukaihei 8-110495, crosstalk in the 3D display apparatus is determined depending on an aperture ratio of an aperture section of the parallax barrier, and it is understood that no crosstalk occurs at an optimum viewing position.

Further, the aforementioned 3D display apparatus and the display apparatus which supplies different images to respective observers employ display-use liquid crystal panels, which basically have a same structure. In each of the display-use liquid crystal panels, each pixel pattern includes TFT devices and transparent pixel electrodes, for example. Further, each of the pixel patterns is disposed, in a matrix manner, at each intersection of a gate line and a source line. The gate lines and the source lines are isolated by an interlayer insulating film interposed in between.

In such a liquid crystal display panel, normally, there is not sufficient liquid crystal capacitance between a pixel electrode and an opposing electrode. Therefore, an auxiliary capacity line is provided in parallel to a gate line. When extending a drain electrode of a TFT device up to the auxiliary capacity line, a section in which the drain electrode and the auxiliary capacity line are superimposed is formed. This allows an auxiliary capacitor (an electric charge holding capacitor) to be formed between the drain electrode and the auxiliary capacity line in the superimposed section. An insulating layer between the drain electrode and the auxiliary capacity line in the superimposed section acts as an insulating material.

However, inventors of the present invention have found that when the conventional liquid crystal panel is used in a 3D display apparatus or the like, crosstalk occurs even in the optimum viewing position, where no crosstalk is supposed to occur according to the publication Tokukaihei 8-110495. This causes display performance to be degraded due to the crosstalk.

That is, in each of the pixel patterns on the liquid crystal display panel, an aperture section, i.e., a light-transmitting region, will not be in a simple rectangular shape due to positions of the disposed TFT devices and/or auxiliary capacitors, or other factors. In this case, the aperture section may partially have a narrow gap due to positions or shapes of the disposed TFT devices or auxiliary capacitors, or other factors.

When the light passes through small aperture sections with a regular interval, the light has a characteristic causing its propagation direction to curve (i.e., diffraction phenomenon). As such, when a pixel pattern includes such aperture sections having a narrow gap, light passing through the aperture sections causes a diffraction phenomenon.

On this account, as illustrated in FIG. 9, in a 3D display apparatus in which a parallax barrier and a display-use liquid crystal panel are combined, for example, in cases where light causes the diffraction phenomenon during a period in which the light, to which a specific viewing angle is given, passes through the parallax barrier, it becomes impossible to completely separate the light into "light for the left eye" and "light for the right eye". This would give rise to the problem that an optical crosstalk occurs and a 3D display performance is degraded.

Specifically, when the light is diffracted as it passes through the aperture sections having a narrow gap (indicated by bold lines in FIG. 9), in addition to the light to which a specific viewing angle is given as it passes through the parallax barrier, the light thus diffracted causes to serve to supply the left eye image and the right eye image to the right eye and the left eye of the observer, respectively (in this specification, such optical behavior is referred to as crosstalk). The crosstalk behavior causes an image to be appeared as a blurred image during 3D display. Note that, the similar problem occurs during a display in which different images are supplied to a plurality of observers. In this case, the observers perceive an image in which one display image overlaps another display image.

The crosstalk due to the diffraction phenomenon is not an inherent problem in a parallax barrier system, but occurs in other systems such as systems using lens arrays or glasses. Further, the crosstalk occurs not only in a system where a display image is separated according to a plurality of viewpoints at one time, but also in a system where a display image is separated according to a plurality of viewpoints in a time division manner.

BRIEF SUMMARY

The technology disclosed herein is made to solve the foregoing problems, and to provide a display panel and a display apparatus each of which suppresses a crosstalk due to diffraction phenomenon and improves a 3D display and a display which supplies different images to a plurality of observers.

To attain the above object, a display panel of an example embodiment includes: display image generating means for generating a display image according to inputted display data; and display image separating means for separating the display image, at one time or in a time division manner, according to a plurality of viewpoints, the display image generating means being an active matrix type display panel, aperture sections in each pixel pattern of the display panel having a width set so as to satisfy the following inequality:

0<(minimum width of the aperture sections in the pixel)/(maximum width of the aperture sections in the pixel)≦0.037, or 0.130≦(minimum width of the aperture sections in the pixel)/(maximum width of the aperture sections in the pixel)<1.

According to the arrangement, by setting the width of the aperture sections in each pixel pattern to the range specified above, it is possible for crosstalk to have a value of less than 5.6, the crosstalk occurring due to a diffraction phenomenon during a display in which a display image is separated according to a plurality of respective viewpoints at one time or in a time division manner. This allows a reduction in negative effects on the visibility.

Further, to attain the above object, another display panel of an example embodiment includes: display image generating means for generating a display image according to inputted display data; and display image separating means for separating the display image, at one time or in a time division manner, according to a plurality of viewpoints, the display image generating means being an active matrix type display panel, aperture sections in each pixel pattern of the display panel having a width set so as not to fall within a range specified by the following inequality: 2 μm<(minimum width of the aperture sections in the pixel)<7 m.

According to the arrangement, by setting the width of the aperture sections in each pixel pattern to the range specified above, it is possible for a crosstalk to have a value of less than 5.6, the crosstalk occurring due to a diffraction phenomenon during a display in which a display image is separated according to a plurality of respective viewpoints at one time or in a time division manner. This allows a reduction in negative effects on the visibility.

To attain the above object, another display panel of the an example embodiment includes: display image generating means for generating a display image according to inputted display data; and display image separating means for separating the display image, at one time or in a time division manner, according to a plurality of viewpoints, the display image generating means being an active matrix type display panel, a light shielding film being provided to avoid that the light enters aperture sections, in each pixel pattern of the display panel, having a narrow gap.

According to the arrangement, in a case where a pixel pattern includes aperture sections causing a crosstalk due to a diffraction phenomenon giving rise to negative effects on the visibility, it is possible to prevent crosstalk due to the diffraction phenomenon by covering the aperture sections with the light-shielding film so that the diffracted light causing the crosstalk is blocked.

Additional objects, features, and strengths of the technology disclosed herein will be made clear by the description below. Further, the advantages of the technology disclosed herein will be evident from the following explanation in reference to the drawings.

DETAILED DESCRIPTION

With reference to figures, one example embodiment is described below.

Figure 2:
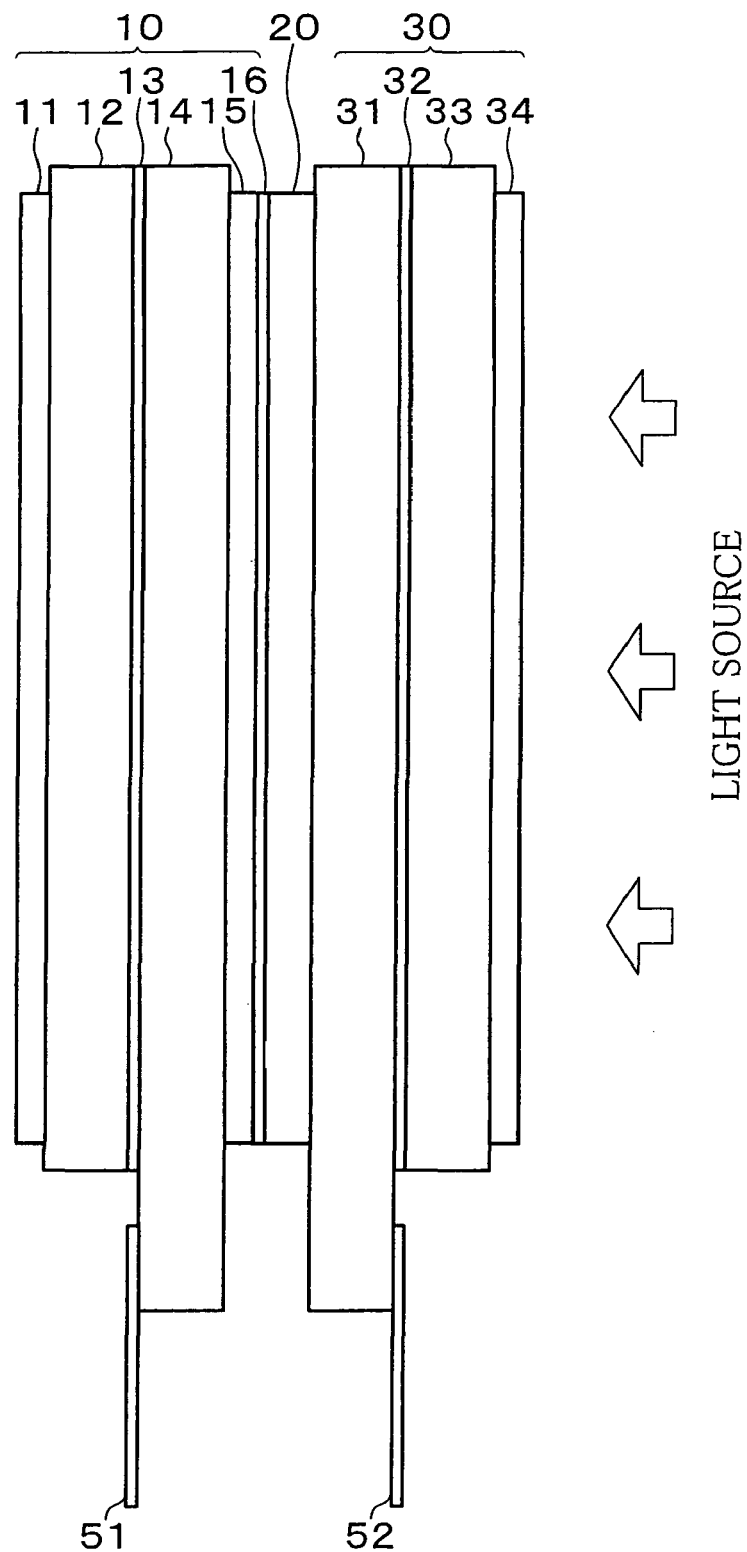
FIG. 2 is a cross-sectional view illustrating an exemplary structure of a 2D/3D switching type liquid crystal display panel to which the technology disclosed herein is applied.

First, FIG. 2 illustrates a schematic structure of a 2D/3D switching type liquid crystal display panel of an example embodiment. Note that, the present embodiment takes as an example a liquid crystal display panel of the technology disclosed herein applied to a 2D/3D switching type liquid crystal display panel.

As shown in FIG. 2, the 2D/3D switching type liquid crystal display panel includes a display-use liquid crystal panel (display image generating means) 10, a patterned retardation plate (parallax barrier means) 20, and a switching liquid crystal panel 30, which are bonded together. The 2D/3D switching type liquid crystal display panel of the present embodiment is integrated with driving circuits, a backlight (light source), and other components, which realizes a 2D/3D switching type liquid crystal display apparatus.

The display-use liquid crystal panel 10 is provided as a TFT liquid crystal display panel, and includes a first polarizing plate 11, an opposing substrate 12, a liquid crystal layer 13, an active matrix substrate 14, and a second polarizing plate 15, which are stacked in layers. Through wiring 51 such as flexible printed circuits (FPC), the active matrix substrate 14 receives image data corresponding to an image to be displayed. Further, a surface of the second polarizing plate 15 is coated with an organic film, i.e., an acrylic resin film 16.

Figure 3A:
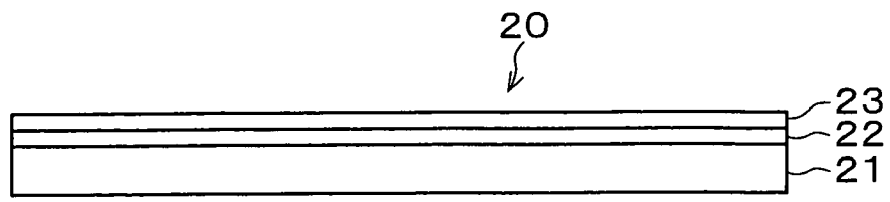
FIG. 3(a) is a cross-sectional view illustrating a structure of a patterned retardation plate used in the 2D/3D switching type liquid crystal display panel.
Figure 3B:
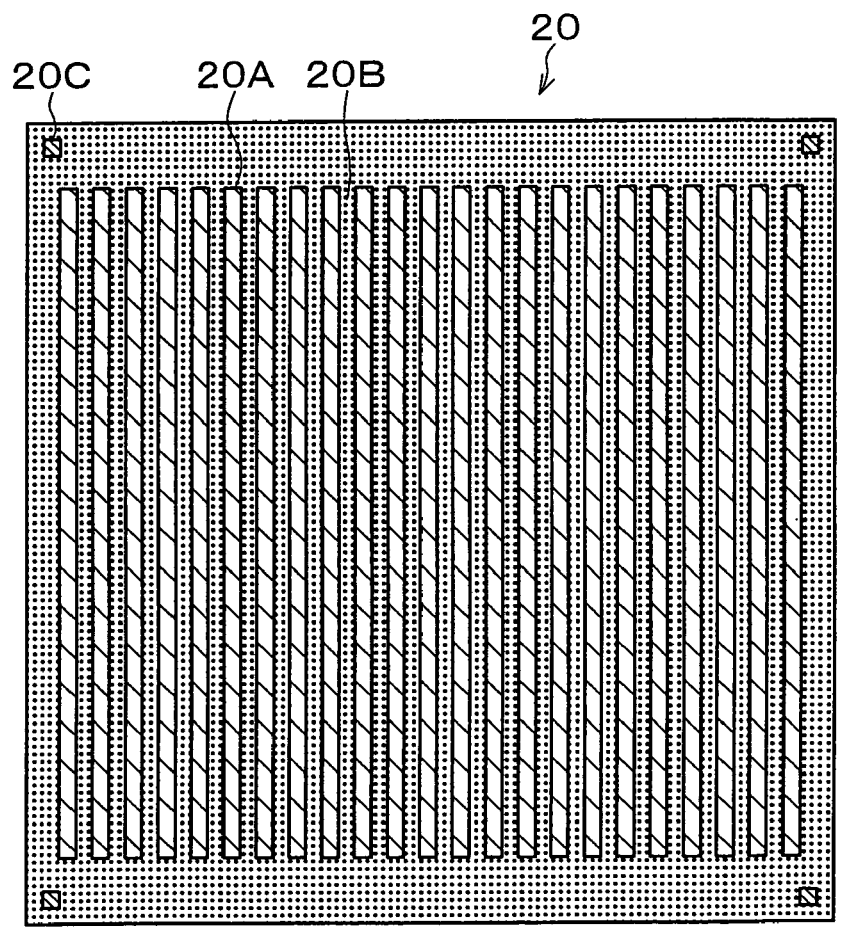
FIG. 3(b) is a plan view illustrating a structure of the patterned retardation plate used in the 2D/3D switching type liquid crystal display panel.

The patterned retardation plate 20 functions as a part of a parallax barrier. As shown in FIG. 3(a), the patterned retardation plate 20 includes a transparent substrate 21, an alignment film 22, and a liquid crystal layer 23, which are stacked upwards from bottom in this order. In an active area of the patterned retardation plate 20, as shown in FIG. 3(b), first regions 20A (hatched regions in the figure) and second regions 20B (stippled regions in the figure), having different polarization states, are arranged alternately in a stripe pattern. Further, the patterned retardation plate 20 is provided with an alignment mark 20c, which is formed in the same process for forming the first region 20A.

The switching liquid crystal panel 30 includes a driver-side substrate 31, a liquid crystal layer 32, an opposing substrate 33, and a third polarizing plate 34, which are stacked in layers. The driver-side substrate 31 is connected to wiring 52. Through the wiring 52, a driving voltage is applied to the driver-side substrate 31 when the liquid crystal layer 32 is ON.

The switching liquid crystal panel 30 is provided as switching means for switching a polarization state of light passing through the switching liquid crystal panel 30 upon switching of the liquid crystal layer 32 ON or OFF. Specifically, the switching liquid crystal panel 30 optically modulates the light passing through the switching liquid crystal panel 30 differently in the 2D and 3D display modes. Unlike the display-use liquid crystal panel 10, the switching liquid crystal panel 30 does not need to be driven in a matrix manner. Driving electrodes, which are provided on the driver-side substrate 31 and the opposing substrate 33, are formed over an entire surface of an active area of the switching liquid crystal panel 30.

The following describes a display operation of the 2D/3D switching type liquid crystal display panel arranged in the foregoing manner.

Figure 4:
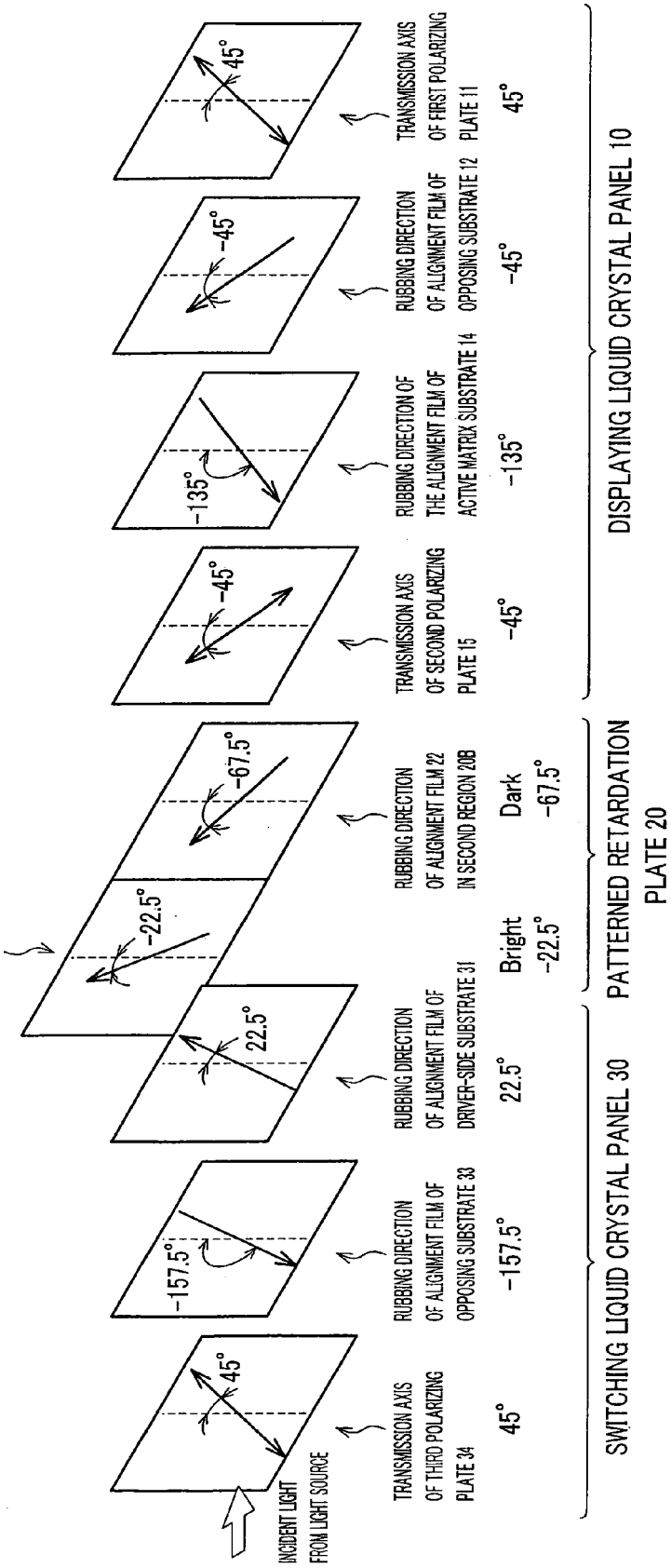
FIG. 4 is a view illustrating an optical axis direction in each member of the 2D/3D switching type liquid crystal display panel.

To begin with, FIG. 4 illustrates an optical axis direction of each member of the 2D/3D switching type liquid crystal display panel shown in FIG. 2. In the liquid crystal panels and retardation plate, the optical axes shown in FIG. 4 are directed in the direction of a slow axis of the alignment film (i.e. a rubbing direction of the alignment film). In the polarizing plates, the optical axes are directed in the direction of a transmission axis.

In the arrangement of FIG. 4, incident light emitted from a light source is firstly polarized by the third polarizing plate 34 of the switching liquid crystal panel 30. In the 3D display mode, the switching liquid crystal display panel 30 functions as a half wave plate in the off state.

The light having passed through the switching liquid crystal panel 30 then enters the patterned retardation plate 20. In the first region 20A and the second region 20B of the patterned retardation plate 20, rubbing directions, i.e. directions of slow axes, are different. Therefore, light having passed through the first region 20A and light having passed through the second region 20B are polarized differently. In FIG. 4, the polarization axis of light passing through the first region 20A and the polarization axis of the passing through the second region 20B are shifted from each other by 90°. The birefringence anisotropy and thickness of the liquid crystal layer 23 is set so that the patterned retardation plate 20 serves as a half wave plate.

The light having passed through the patterned retardation plate 20 enters the second polarizing plate 15 of the display-use liquid crystal panel 10. When 3D display is performed, the polarization axis of the light having passed through the first region 20A of the patterned retardation plate 20 is parallel to the transmission axis of the second polarizing plate 15. Therefore, the light having passed through the first region 20A passes through the polarizing plate 15. On the other hand, the polarization axis of the light having passed through the second region 20B forms an angle of 90° with the transmission axis of the second polarizing plate 15. Therefore, the light having passed through the second region 20B is not transmitted through the polarizing plate 15.

According to the arrangement in FIG. 4, the function of the parallax barrier is attained by optical interaction between the patterned retardation plate 20 and the second polarizing plate 15. According to this arrangement, the first region 20A of the patterned retardation plate 20 serves as a light-transmitting region, and the second region 20B of the patterned retardation plate 20 serves as a light-shielding region.

The light having passed through the second polarizing plate 15 is subjected to optical modulation in the liquid crystal layer 13 of the display-use liquid crystal panel 10. The optical modulation is different for the pixels undergoing black display and the pixels undergoing white display. Only the light having subjected to optical modulation of the pixels undergoing white display is transmitted through the first polarizing plate 11, which thus provides image display.

In the 3D display mode, light-transmitting region light rays are given specific viewing angles as the light rays pass through the light-transmitting regions of the parallax barrier. Then, the light rays pass display-use liquid crystal panel 10 through pixels corresponding to a right eye image and pixels corresponding to a left eye image of the display-use liquid crystal panel 10. This causes the separation between the right eye image and the left eye image with respectively different viewing angles, thus providing a 3D display.

In the 2D display mode, the switching liquid crystal panel 30 is turned ON, so that the light passing through the switching liquid crystal panel 30 will not be optically modulated. The light having passed through the switching liquid crystal panel 30 passes through the patterned retardation plate 20 in such a manner that the light having passed through the first region 20A and the light having passed through the second region 20B have different polarization states.

However, unlike the 3D display mode, the switching liquid crystal display panel 30 does not perform optical modulation in the 2D display mode. Therefore, the polarization axis of the light having passed through the patterned retardation plate 20 will be symmetrical with respect to the transmission axis of the second polarizing plate 15. As a result, the light having passed through the first region 20A of the patterned retardation plate 20 and the light having passed through the second region 20B of the patterned retardation plate 20 pass through the second polarizing plate 15 at the same transmittance. Thus, the function of the parallax barrier due to optical interaction between the patterned retardation plate 20 and the second polarizing plate 15 is not attained (that is, no specific viewing angles are given), with the result that 2D display is carried out.

The foregoing takes as an example a liquid crystal display panel of the technology disclosed herein applied to a 2D/3D switching type liquid crystal display panel. However, an object of the technology disclosed herein is to prevent crosstalk due to diffraction phenomenon in a display-use liquid crystal panel used in a 3D display apparatus or a display apparatus which supplies different images to a plurality of observers. Thus, the technology disclosed herein may be applied to (i) a 3D type liquid crystal display panel or 3D type liquid crystal display apparatus which does not include the switching liquid crystal panel 30 (i.e. an exclusive arrangement for the 3D display) or (ii) a display apparatus which supplies different images to respective observers (an arrangement allowing switching between a display mode in which different images are supplied to respective observers and a normal display mode, or an exclusive arrangement for displays of different images to respective observers).

In the case where the technology disclosed herein is applied to (i) the 3D type liquid crystal display panel which does not include a switching liquid crystal panel or (ii) the display apparatus which supplies different images to respective observers, a half wave plate is provided instead of the switching liquid crystal panel, and a slow axis of the half wave plate is adjusted to be in a rubbing direction of the switching liquid crystal panel. However, the third polarizing plate 34 shown in FIG. 2 remains on the light source side of the half wave plate, which is provided instead of the switching liquid crystal panel (on the surface of the patterned retardation plate 20 opposite to its surface to which the liquid crystal panel 10 is bonded).

The technology disclosed herein is not limited to the foresaid liquid crystal display panel or liquid crystal display apparatus. The technology disclosed herein is applied to (i) a display panel or display apparatus which has, instead of the switching liquid crystal panel 30 or the patterned retardation plate 20, a parallax barrier made of a light shielding material such as a light shielding metal film or black resin, or (ii) a display panel or display apparatus in which a light shielding material is directly deposited in a stripe pattern on the opposing substrate 12 or the active matrix substrate 14. Needless to say, the display panel or the display apparatus which employs such a parallax barrier can be applied to the display panel or the display apparatus exclusive for (i) the 3D display or (ii) the displays of different images to respective observers.

The technology disclosed herein is not limited to the foresaid liquid crystal display panel or liquid crystal display apparatus. The technology disclosed herein is applied to (i) a display panel or display apparatus which has, instead of the switching liquid crystal panel 30 or the patterned retardation plate 20, a parallax barrier made of a light shielding material such as a light shielding metal film or black resin, or (ii) a display panel or display apparatus in which a light shielding material is directly deposited in a stripe pattern on the opposing substrate 12 or the active matrix substrate 14. Needless to say, the display panel or the display apparatus which employs such a parallax barrier can be applied to the display panel or the display apparatus exclusive for (i) the 3D display or (ii) the displays of different images to respective observers.

In the liquid crystal display apparatus of the technology disclosed herein, the displaying liquid crystal panel serves as a main component for preventing a crosstalk due to the diffraction phenomenon occurred in the displaying liquid crystal panel. Thus, the following describes details of the structure of the displaying liquid crystal panel of the present embodiment.

Figure 1:
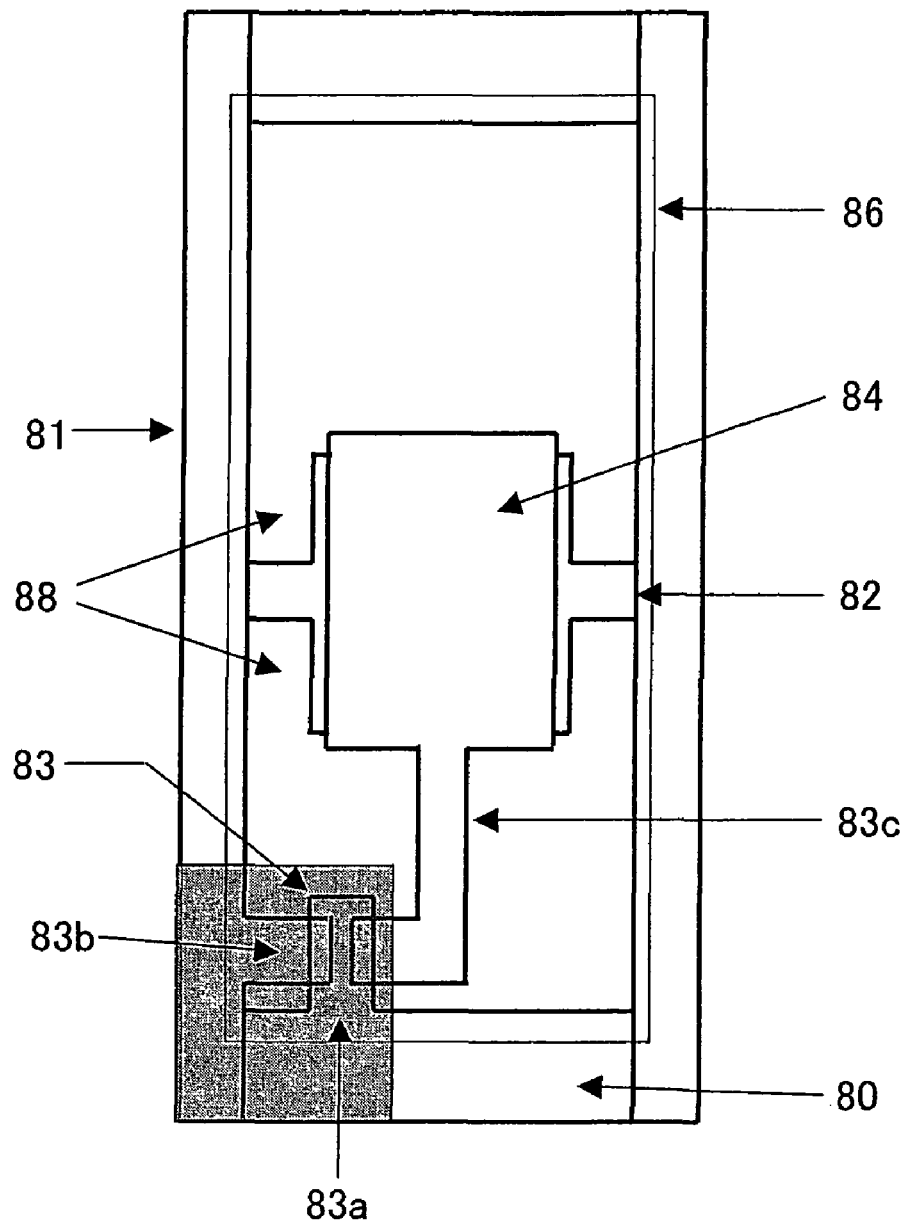
FIG. 1 is a plan view illustrating a pixel pattern on a displaying panel according to one example embodiment.

In the active matrix substrate 14 of the display-use liquid crystal panel 10 used in a display apparatus of the present embodiment, the display-use liquid crystal panel has pixel patterns, each including TFT devices 83 and transparent pixel electrodes 86 as illustrated in FIG. 1. Further, each of the pixel patterns is disposed, in a matrix manner, at each intersection of a gate line 80 and a source line 81. The gate lines 80 and the source lines 81 are isolated by an interlayer insulating film interposed in between (not shown).

In the liquid crystal display panel, normally, there is not sufficient liquid crystal capacitance between the pixel electrode 86 and an opposing electrode (not shown). Therefore, an auxiliary capacity line (auxiliary capacity wiring) 82 is provided in parallel to a gate line 80. When extending a drain electrode 83c of a TFT device up to the auxiliary capacity line 82, a section in which the drain electrode 83c and the auxiliary capacity line 82 are superimposed is formed. This allows an auxiliary capacitor (an electric charge holding capacitor) 84 to be formed between the drain electrode 83c and the auxiliary capacity line 82 in the superimposed section.

The drain electrode 83c of the TFT device 83 is connected to the pixel electrode 86 through a hole provided on the interlayer insulating film, specifically in a portion corresponding to the auxiliary capacitor 84, and a gate electrode 83a is connected to the gate line 80 which supplies a scan signal for switching on or off the TFT device 83. On the other hand, a source electrode 83b is connected to the source line 81 which inputs an image signal to the pixel electrode through the TFT device 83.

The auxiliary capacity line 82 produces negative capacitance since the insulating film, disposed at the intersection with the source line 81, serves as an insulating material. The negative capacitance causes delays of the scan signal and the image signal. Therefore, the negative capacitance is lowered by reducing an area of the auxiliary capacity line 82 over the source line 81 at the intersection. Specifically, the reduction in the area is realized by reducing the width of the auxiliary capacity line 82. On the other hand, in order to secure the auxiliary capacitance, the auxiliary capacitor 84 itself is enlarged in width so as to be maximally close to the source lines 81 provided on the both edges of the pixel pattern. That is, the auxiliary capacity line 82 is formed to have a narrow line width at the intersection with the source line 81, while having a broad line width in the pixel pattern.

As noted above, the width of the auxiliary capacity line 82 over the source line 81 is made to be narrow so that an area at the intersection is reduced, while the auxiliary capacitor 84 is enlarged in width so as to be close to the source lines 81 provided on the both edges of the pixel pattern. By forming the auxiliary capacitor 84 in such a shape, narrow gaps, i.e., aperture sections 88, are created between Cs (auxiliary capacitor) and the source lines.

For a liquid crystal display panel as shown in FIG. 1, the greatest concern is that the narrow-gap aperture sections 88 between the Cs and the source lines may have the diffraction phenomenon causing a crosstalk.

With a liquid crystal display panel of the technology disclosed herein, two methods are broadly proposed for reducing the diffraction phenomenon and suppressing a crosstalk.

A first method for suppressing a crosstalk is a method of obtaining the conditions causing diffraction of light passing through the narrow-gap aperture sections and then designing the pixel patterns having no such narrow-gap aperture sections at the designing phase of the pixel patterns. The first method is described below.

Figure 5:
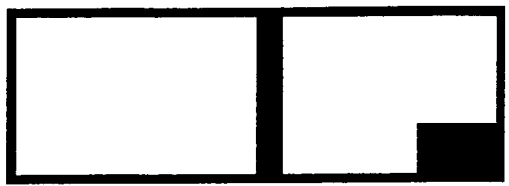
FIG. 5(a) is a view illustrating a pixel pattern used in simulations to investigate how the width of an aperture affects a crosstalk.
FIG. 5(b) is a view illustrating how a pixel pattern is when the width of the aperture section shown in FIG. 5(a) is 0%.
FIG. 5(c) is a view illustrating how a pixel pattern is when the width of the aperture section shown in FIG. 5(a) is 100%.
Figure 5:
Figure 5:
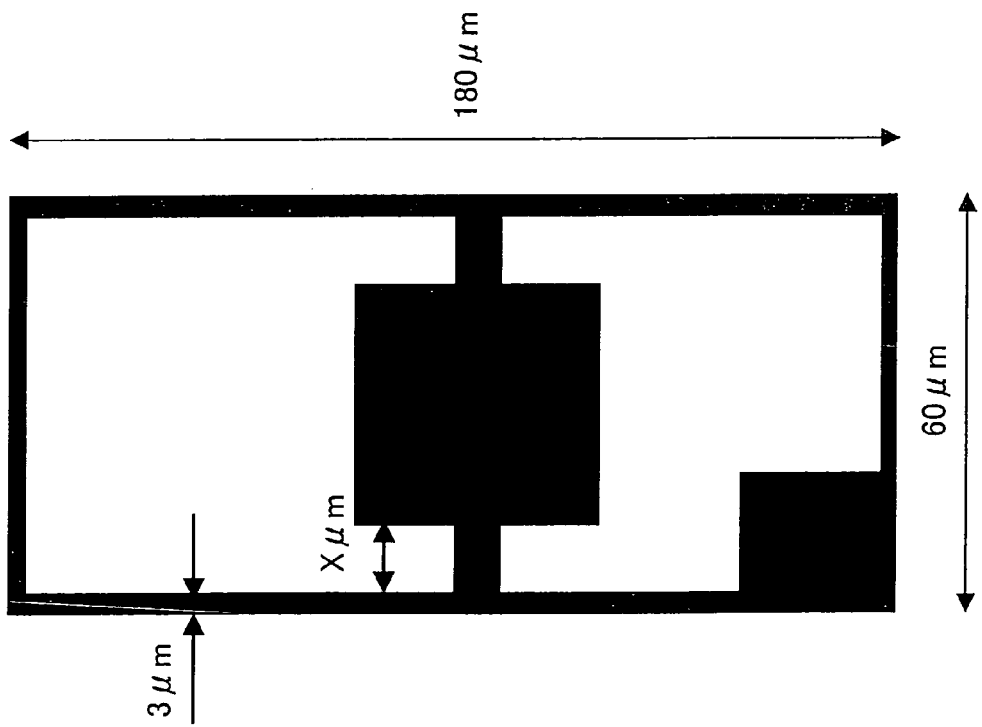

The following describes a result of performing simulations to investigate a relationship between the width of the narrow-gap aperture sections and a crosstalk in the pixel patterns. First, the pixel patterns used in the simulations is described with reference to FIG. 5.

As illustrated in FIG. 5(a), the pixel pattern has a length of 180 μm and a breadth 60 μm (hereinafter referred to as vertical size and breadth size, respectively, for ease of explanation). The source lines and the gate lines have a width of 3 μm each. Thus, in each pixel pattern, a maximum breadth size of the aperture regions surrounded by the source lines and the gate lines is calculated by $$60-3\times 2=54 \text{ [μm]}.$$

Further, in the pixel pattern, the auxiliary capacitor is provided in the aperture region, and the auxiliary capacity line constituting the auxiliary capacitor is made to have a reduced line width at the intersection with the source line. This results in creating the aperture sections having a narrow gap of x μM wide between the Cs (auxiliary capacitor) and the source lines. In the following simulations, crosstalk values are obtained in cases where the width of the narrow-gap aperture sections, i.e., x μm, is changed by 1 μm pitch from 0 μm to 27 μm. Note that, in a case where the width x μm of the aperture sections is 0 μm, as illustrated in FIG. 5(b), the auxiliary capacity line is made to have a broad line width entirely, with the result that no narrow-gap aperture section is created. On the other hand, in a case where the width x μm of the aperture sections is 27 μm, as illustrated in FIG. 5(c), the auxiliary capacity line is made to be thin entirely, with the result that no narrow-gap aperture section is created.

Since such a crosstalk occurs in carrying out a 3D display realized using a displaying liquid crystal panel having the pixel patterns and a parallax barrier (or in carrying out display which supplies different images to a plurality of observers), the following simulations were performed by setting a slit of the parallax barrier to have a width of 30 μm, 33 μm, and 35 μm, respectively.

Further, the crosstalk values calculated by the simulations are dimensionless values determined by the following equation (1). In the equation (1), Dark indicates a brightness in black display when black display is carried out for either one of the right eye image and the left eye image and white display is carried out for the other. On the other hand, Black indicates a brightness in black display when black display is carried out for both of the right eye image and the left eye image. Further, Bright indicates a brightness in white display when black display is carried out for either one of the right eye image and the left eye image and white display is carried out for the other. The larger crosstalk occurs, the higher brightness Dark becomes due to the crosstalk effect. As a result, the increased difference is given between Dark and Black, resulting in an increase of a crosstalk value expressed in the equation (1). Needless to say, it is also possible to obtain the crosstalk value by measuring the brightness and performing calculation based on the equation (i):

$$\text{Crosstalk value} = \frac{\text{Dark} - \text{Black}}{\text{Bright} - \text{Black}}. \tag{1}$$

Figure 6:
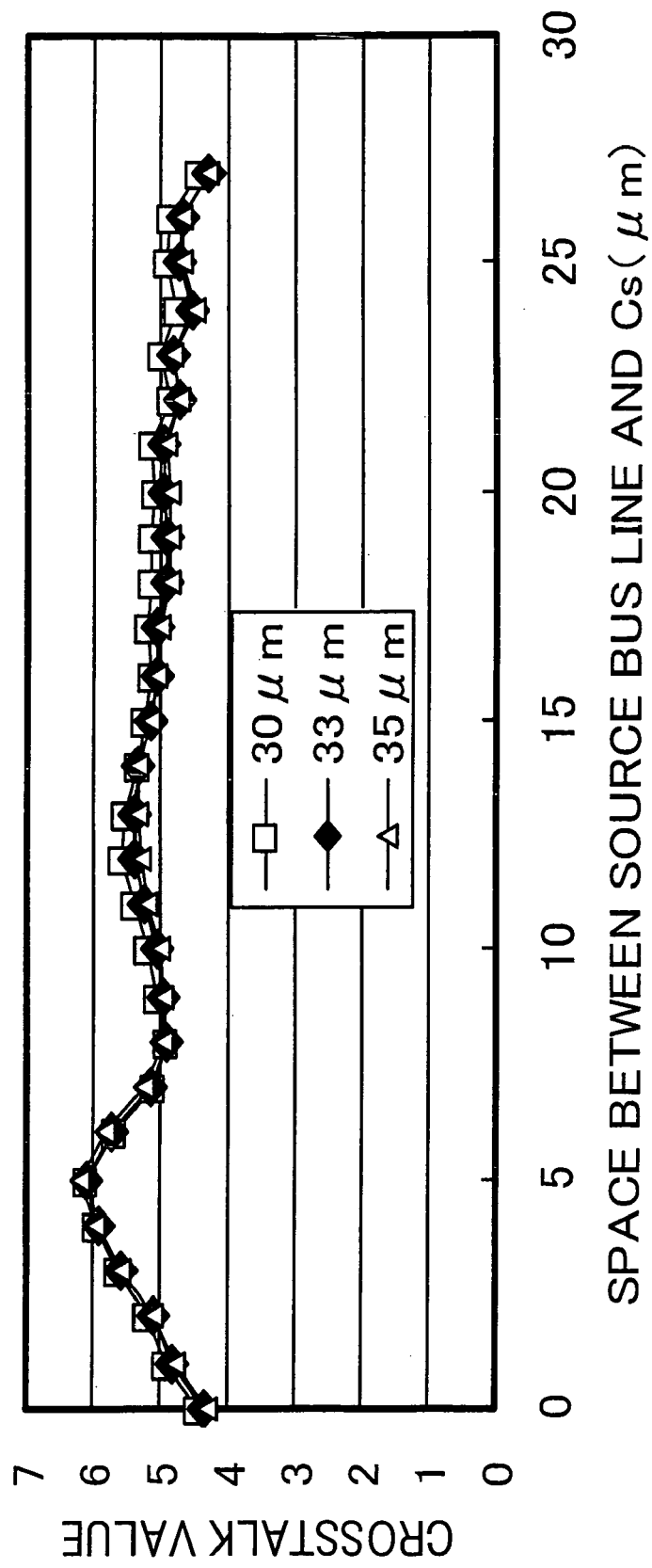
FIG. 6 is a graph showing a result of the simulations.

The result of the simulations is shown in Table 1. Further, FIG. 6 is a graph plotting the result shown in Table 1.

In the simulations, the crosstalk values are obtained by calculating a propagation direction of light emitted from a light source based on (i) the size of a pixel element, the width of an aperture section, the thickness of a substrate, the refractive index of a substrate, the wavelength of the light source, which are used for generating a display image in a liquid crystal display apparatus and (ii) distances between the two eyes. Then, the crosstalk value is calculated based on the optimum pitch and width of a slit provided on a patterned retardation plate.

| WIDTH OF SLIT [μm] | SPACE BETWEEN Cs AND SOURCE LINE [μm] | | | | | | | | | |
|---|---|---|---|---|---|---|---|---|---|---|
| | 0 | 1 | 2 | 3 | 4 | 5 | 6 | 7 | 8 | 9 |
| 30 | 4.415 | 4.886 | 5.181 | 5.639 | 5.971 | 6.105 | 5.672 | 5.086 | 4.927 | 5.062 |
| 33 | 4.311 | 4.786 | 5.089 | 5.572 | 5.926 | 6.116 | 5.721 | 5.130 | 4.896 | 4.945 |
| 35 | 4.301 | 4.781 | 5.091 | 5.595 | 5.967 | 6.190 | 5.830 | 5.246 | 4.954 | 4.949 |

| WIDTH OF SLIT [μm] | SPACE BETWEEN Cs AND SOURCE LINE [μm] | | | | | | | | | |
|---|---|---|---|---|---|---|---|---|---|---|
| | 10 | 11 | 12 | 13 | 14 | 15 | 16 | 17 | 18 | 19 |
| 30 | 5.175 | 5.393 | 5.566 | 5.515 | 5.355 | 5.228 | 5.135 | 5.187 | 5.147 | 5.132 |
| 33 | 5.029 | 5.220 | 5.371 | 5.385 | 5.311 | 5.152 | 5.026 | 5.027 | 4.928 | 4.926 |
| 35 | 5.018 | 5.179 | 5.304 | 5.351 | 5.312 | 5.165 | 5.060 | 5.013 | 4.859 | 4.860 |

| WIDTH OF SLIT [μm] | SPACE BETWEEN Cs AND SOURCE LINE [μm] | | | | | | | |
|---|---|---|---|---|---|---|---|---|
| | 20 | 21 | 22 | 23 | 24 | 25 | 26 | 27 |
| 30 | 5.100 | 5.151 | 4.859 | 4.982 | 4.740 | 4.891 | 4.843 | 4.415 |
| 33 | 4.934 | 4.947 | 4.718 | 4.832 | 4.545 | 4.719 | 4.689 | 4.309 |
| 35 | 4.875 | 4.884 | 4.716 | 4.820 | 4.494 | 4.675 | 4.650 | 4.299 |

Table 1 and FIG. 6 show a result of the crosstalk values obtained by the simulations, where the width of the slit of the patterned retardation plate and the width of the narrow-gap aperture sections in the pixel are both changed. Note that, the values for the width of the slit of the patterned retardation plate, shown in Table 1, are calculated based on the pixel illustrated in FIG. 5.

As can been seen from the result shown in Table 1 and FIG. 6, the crosstalk values significantly increase when the width x μm of the aperture sections ranges from 3 μm to 6 μm. That is, in the displaying liquid crystal panel of the present embodiment, it is preferable to eliminate the narrow-gap aperture sections having the width ranging from 3 μm to 6 μm. Meanwhile, when the crosstalk value is 5.6 or greater, there occurs a crosstalk which affects visibility in a 3D display or a display supplying different video images to a plurality of observers. Thus, by eliminating the aperture sections having the width ranging from 3 μm to 6 μm, the crosstalk value is made to be below 5.6, and thereby the crosstalk effect is suppressed. That is, as is apparent from the result shown in Table 1, the width x μm of the aperture section is not more than 2 μm or not less than 7 μm in order to obtain crosstalk values of below 5.6.

According to the result shown in Table 1 and FIG. 6, the range of the width of the aperture sections which causes a crosstalk that affects the visibility may be expressed by the following inequality:

(minimum width of the aperture sections in the pixel)/ maximum width of the aperture sections in the pixel).

Here, the maximum width of the aperture section in the pixel is 54 μm in the direction along the width x μm of the aperture sections where the diffraction phenomenon is considered. In this case, the range of the width of the aperture section causing the crosstalk value to be 5.6 or greater is given by the following inequality:

0.037<(minimum width of the aperture sections in the pixel)/(maximum width of the aperture sections in the pixel)<0.130.

In other words, in carrying out a 3D display or a display which supplies different video images to a plurality of observers, it is possible to prevent the crosstalk effect on the visibility by setting the width of all the aperture sections appeared in the pixel pattern to satisfy the following inequality:

0<(minimum width of the aperture sections in the pixel)/(maximum width of the aperture sections in the pixel)≦0.037, or 0.130≦(minimum width of the aperture sections in the pixel)/(maximum width of the aperture sections in the pixel)<1.

Further, in the displaying liquid crystal panel of the present embodiment, by setting the narrow-gap aperture sections to have a width in such a range that the crosstalk value becomes below 5.2, it is possible to further reduce the negative effect on the visibility in carrying out a 3D display or a display which supplies different video images to a plurality of observers.

According to Table 1, in order to have a crosstalk value of below 5.2, the aperture section is set to have a width in a range specified by the following inequality:

0<(minimum width of the aperture sections in the pixel)/(maximum width of the aperture sections in the pixel)≦0.037, or 0.148≦(minimum width of the aperture sections in the pixel)/(maximum width of the aperture sections in the pixel)≦0.185, or 0.296≦(minimum width of the aperture sections in the pixel)/(maximum width of the aperture sections in the pixel)<1.

Alternatively, in order to have a crosstalk value below 5.2, a width of the aperture section is set so as not to fall within a range specified by the following inequalities:

2 μm<(minimum width of the aperture sections in the pixel)<8 μm, and

10 μm<(minimum width of the aperture section in the pixel)<16 μm.

In the displaying liquid crystal panel of the present embodiment, it is more preferable to have the crosstalk value of below 4.8 by eliminating the narrow-gap aperture sections having a width ranging from 1 μm to 26 μm. This realizes an extremely high-definition 3D display or display supplying different video images to a plurality of observers, which causes almost no crosstalk.

The foregoing describes the aperture sections appeared between the Cs and the source lines, by way of taking an example of narrow-gap aperture sections causing diffraction phenomenon, i.e., a cause of crosstalk. However, the locations of the narrow-gap aperture sections causing the diffraction phenomenon are not particularly limited. For example, when the drain electrode of the TFT device is formed of a shielding metal film, aperture sections between the drain electrode and the source lines can be applied for the technology disclosed herein.

Figure 7A:
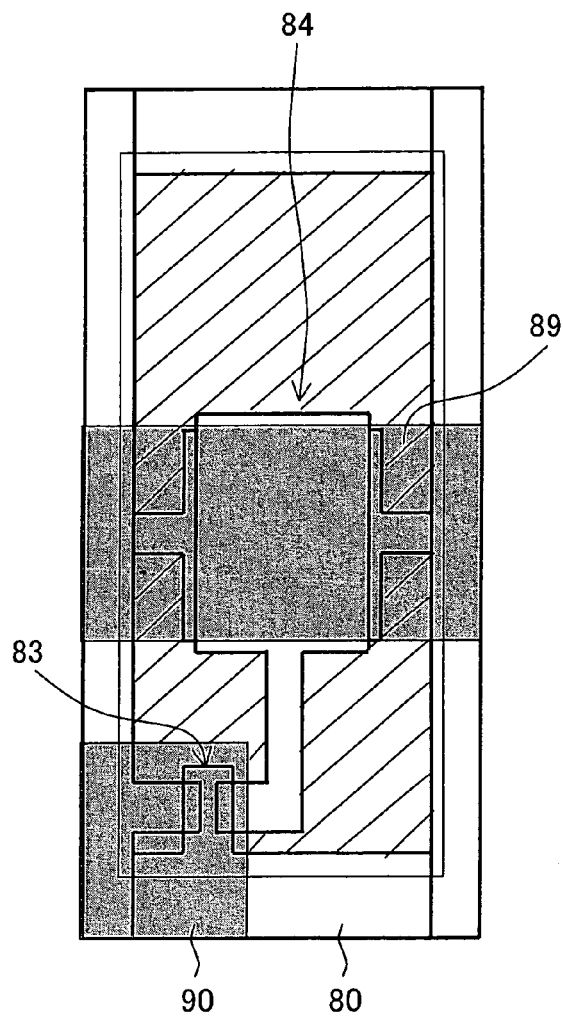
FIG. 7(a) is a plan view illustrating an exemplary structure in which light-shielding films are disposed on aperture sections having a narrow gap in a pixel pattern on a displaying panel according to one example embodiment.
Figure 7B:
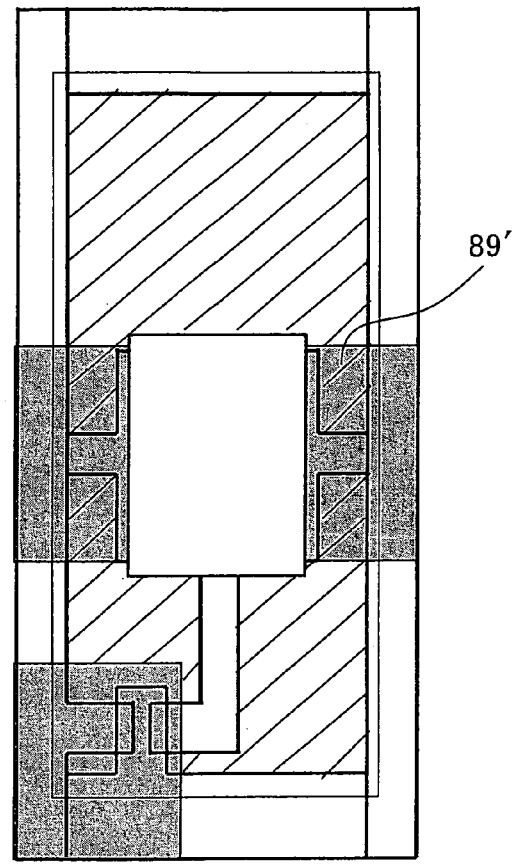
FIG. 7(b) is a plan view illustrating another exemplary structure in which light-shielding films are disposed on aperture sections having a narrow gap in a pixel pattern on a displaying panel according to one example embodiment.
Figure 8A:
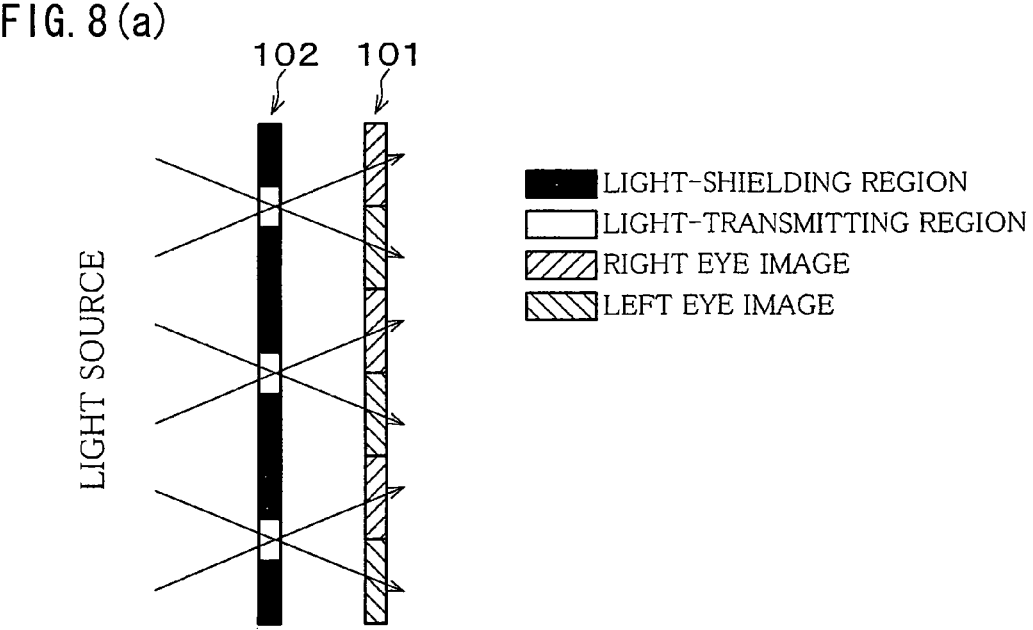
FIG. 8(a) is a view showing an effect of giving a viewing angle caused by a parallax barrier in 3D display.
Figure 8B:
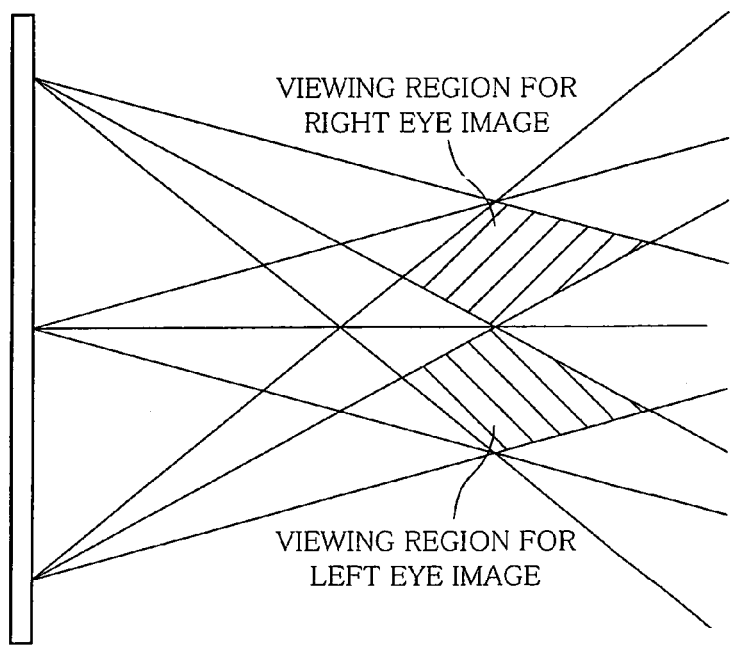
FIG. 8(b) is a view illustrating viewing regions for a 3D display image in 3D display.
Figure 9:
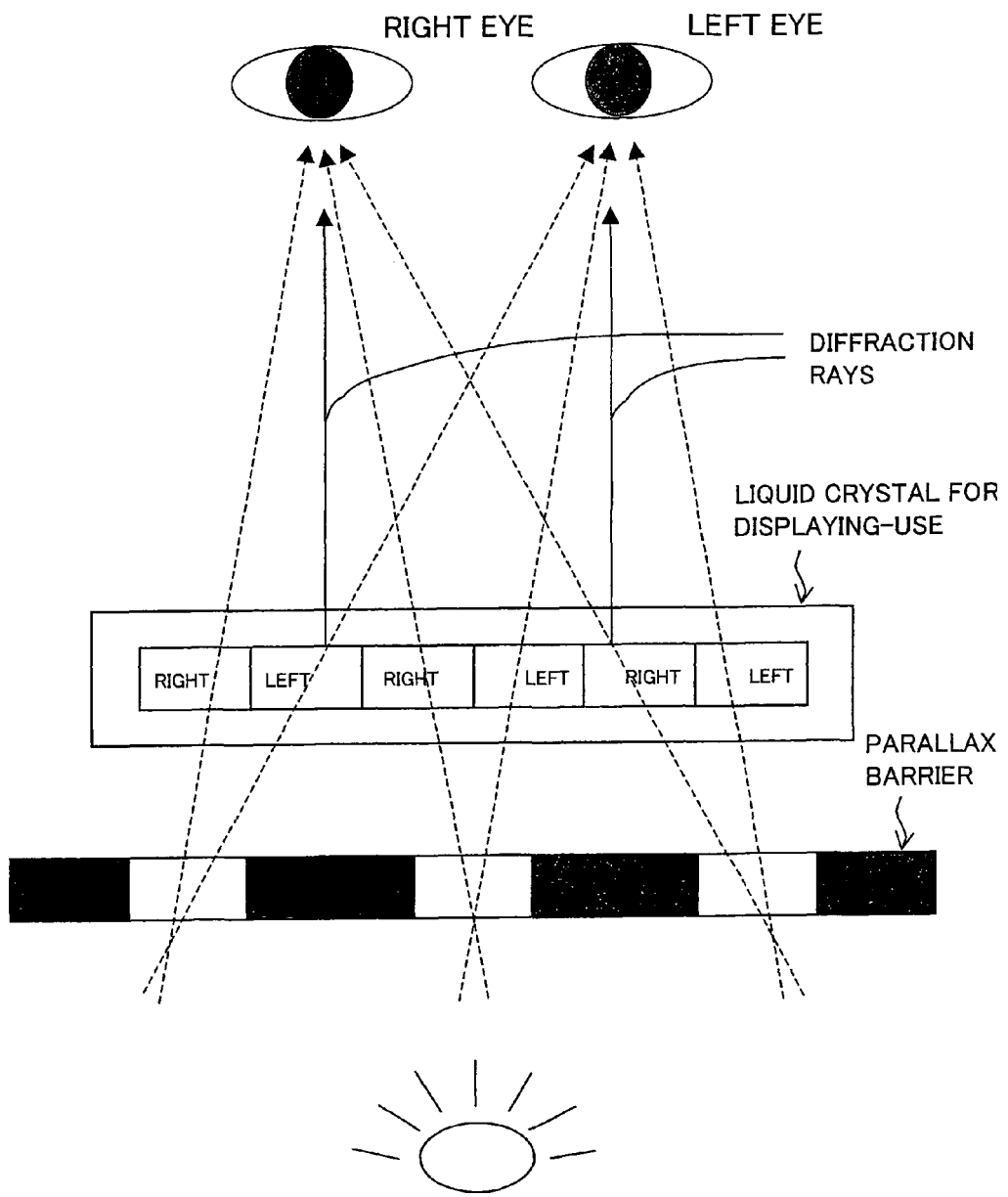
FIG. 9 is a view illustrating a principle that the diffracted light causes a crosstalk in a conventional 3D display apparatus.

A second method for suppressing the crosstalk is considered as follows. When there are aperture sections which cause a crosstalk giving a negative effect on the visibility, the aperture sections are shielded with a shielding film, so that diffraction rays causing crosstalk are blocked. FIGS. 7(*a*) and 7(*b*) illustrate pixel patterns on a displaying liquid crystal panel adopting the second method.

In a pixel element pattern on a displaying liquid crystal panel illustrated in FIG. 7(*a*), a shielding film 89 is disposed in parallel to the gate lines 80 in order to shield the aperture sections appeared between the Cs and the source lines. The shielding film 89 has a width substantially equal to that of auxiliary capacitor 84 in its vertical direction, and is disposed on the opposing substrate side. Further, a shielding film 90 may be provided to shield the TFT device 83. Further, the shielding film for shielding the aperture sections between the Cs and the source lines may be disposed so as to shield only the aperture sections, as shown by shielding films 89' in FIG. 7(*b*). The shielding film may be disposed not only on the opposing substrate, but also on the active matrix substrate.

According to the present embodiment, the foregoing describes a liquid crystal panel adopting an active matrix substrate which may possibly have narrow-gap aperture sections, by way of taking an example of a display-use panel causing the crosstalk issue. However, the present invention is not limited to the liquid crystal panel used as a displaying panel. Apart from the liquid crystal panel, for example, an organic EL panel is considered to serve as a display panel using an active matrix substrate. Even by using an organic EL panel as a displaying panel, if narrow-gap aperture sections appear in a pixel patterns on the panel, a similar problem will occur. Thus, the technology disclosed herein is applied to a display apparatus using an organic EL panel or the like as a displaying panel.

As described above, a display panel of the technology disclosed herein includes: display image generating means for generating a display image according to inputted display data; and display image separating means for separating the display image, at one time or in a time division manner, according to a plurality of viewpoints, the display image generating means being an active matrix type display panel, aperture sections in each pixel pattern of the display panel having a width set so as to satisfy the following inequality:

$0<$(minimum width of the aperture sections in the pixel)/(maximum width of the aperture sections in the pixel)$\leq 0.037$, or $0.130 \leq$(minimum width of the aperture sections in the pixel)/(maximum width of the aperture sections in the pixel)$<1$.

According to the arrangement, by setting the width of the aperture sections in each pixel pattern to the range specified above, it is possible for a crosstalk to have a value of less than 5.6, the crosstalk occurring due to a diffraction phenomenon during a display in which a display image is separated according to a plurality of respective viewpoints at one time or in a time division manner. This allows a reduction in negative effects on the visibility.

Further, in the display panel, the width of the aperture sections in the pixel pattern of the active matrix type display panel is set to satisfy the following inequality:

$0<$(minimum width of the aperture sections in the pixel)/(maximum width of the aperture sections in the pixel)$\leq 0.037$, or $0<$(minimum width of the aperture sections in the pixel)/(maximum width of the aperture sections in the pixel)$\leq 0.037$, $0.148 \leq$(minimum width of the aperture sections in the pixel)/(maximum width of the aperture sections in the pixel)$\leq 0.185$, or $0.296 \leq$(minimum width of the aperture sections in the pixel)/(maximum width of the aperture sections in the pixel)$<1$.

According to the arrangement, by setting the width of the aperture sections in each pixel pattern to the range specified above, it is possible for a crosstalk to have a value of less than 5.2, the crosstalk occurring due to a diffraction phenomenon during a display in which a display image is separated according to a plurality of respective viewpoints at one time or in a time division manner. This allows a reduction in negative effects on the visibility.

Further, according to the present invention, a display panel includes: display image generating means for generating a display image according to inputted display data; and display image separating means for separating the display image, at one time or in a time division manner, according to a plurality of viewpoints, the display image generating means being an active matrix type display panel, aperture sections in each pixel pattern of the display panel having a width set so as not to fall within a range specified by the following inequality:

$2 \mu m<$(minimum width of the aperture sections in the pixel)$<7 \mu m$.

According to the arrangement, by setting the width of the aperture sections in each pixel pattern to the range specified above, it is possible for a crosstalk to have a value of less than 5.6, the crosstalk occurring due to a diffraction phenomenon during a display in which a display image is separated according to a plurality of respective viewpoints at one time or in a time division manner. This allows a reduction in negative effects on the visibility.

Further, in the display panel, the width of the aperture sections in the pixel pattern of the active matrix type display panel is set so as not to fall within a range specified by the following inequalities:

$2 \mu m<$(minimum width of the aperture sections in the pixel)$<8 \mu m$, and $10 \mu m<$(minimum width of the aperture sections in the pixel)$<16 \mu m$.

According to the arrangement, by setting the width of the aperture sections in each pixel pattern to the range specified above, it is possible for a crosstalk to have a value of less than 5.2, the crosstalk occurring due to a diffraction phenomenon during a display in which a display image is separated according to a plurality of respective viewpoints at one time or in a time division manner. This allows a reduction in negative effects on the visibility.

Further, according to the technology disclosed herein, a display panel includes: display image generating means for generating a display image according to inputted display data; and display image separating means for separating the display image, at one time or in a time division manner, according to a plurality of viewpoints, the display image generating means being an active matrix type display panel, aperture sections in each pixel pattern of the display panel having a width set so as not to fall within a range specified by the following inequality:

According to the arrangement, in a case where a pixel pattern includes aperture sections causing a crosstalk due to a diffraction phenomenon giving rise to negative effects on the visibility, it is possible to prevent crosstalk due to the diffraction phenomenon by covering the aperture sections with the light-shielding film so that the diffracted light causing the crosstalk is blocked.

Further, in the display panel, the width of the aperture sections shielded by the light-shielding film is set to satisfy the following inequality:

$0.037<$(minimum width of the aperture sections in the pixel)/(maximum width of the aperture sections in the pixel)$<0.130$.

Further, in the display panel, the width of the aperture sections shielded by the light-shielding film is set to satisfy the following inequality:

$2 \mu m<$(minimum width of the aperture sections in the pixel)$<7 \mu m$.

Further, in the display panel, the active matrix type display panel includes: an auxiliary capacitor in the pixel; and auxiliary capacity wiring constituting the auxiliary capacitor, the auxiliary capacity wiring having a narrow line width at an intersection with a source line and having a broad line width in a pixel pattern.

In the display panel having the above structure, a narrow gap aperture section tends to appear between the Cs (auxiliary capacitor) and the source lines and causes a crosstalk. Thus, the technology disclosed herein is preferably applied to such a display panel.

Further, in the display panel, the active matrix type display panel is a TFT (thin film transistor) driven type display panel.

In the display panel having the above structure, a narrow gap aperture section tends to appear between the TFT device and the source lines and causes a crosstalk. Thus, the present invention is preferably applied to such a display panel.

INDUSTRIAL APPLICABILITY

A display panel of the present invention is capable of separating a display image, at one time or in a time division manner, according to a plurality of viewpoints and displaying different images to the respective viewpoints. With the display panel, a crosstalk due to diffraction rays can be reduced. The present invention is applicable to a 3D display or a display supplying different images to a plurality of observers.

The invention claimed is:

1. A display panel comprising:
a display image generator configured to generate a display image according to inputted display data; and
a display image separator configured to separate the display image, at one time or in a time division manner, according to a plurality of viewpoints,
the display image generator comprising an active matrix type display panel,
the active matrix type display panel being designed such that each region surrounded by gate lines and source lines includes a pixel, the pixel includes auxiliary capacity wiring comprising an auxiliary capacitor, the auxiliary capacity wiring comprising a narrower line width at an intersection with a source line than a line width in a pixel pattern, a direction in which the display image is separated according to a plurality of viewpoints is a lateral direction, the source lines extend in a longitudinal direction, and aperture sections positioned between the auxiliary capacity wiring and the source line have a width set so as not to fall within a range specified by the following inequality:

$$2 \, \mu m < \text{(minimum width of the aperture sections in the pixel)} < 7 \, \mu m.$$

2. The display panel according to claim 1, wherein the width of the aperture sections in the pixel pattern of the active matrix type display panel is set so as not to fall within a range specified by the following inequalities:

$$2 \, \mu m < \text{(minimum width of the aperture sections in the pixel)} < 8 \, \mu m, \text{ and}$$

$$10 \, \mu m < \text{(minimum width of the aperture sections in the pixel)} < 16 \, \mu m.$$

3. The display panel according to claim 1, wherein the active matrix type display panel is a TFT (thin film transistor) driven type display panel.

4. A display apparatus comprising the display panel according to claim 1.

5. A display panel comprising:
a display image generator configured to generate a display image according to inputted display data; and
a display image separator configured to separate the display image, at one time or in a time division manner, according to a plurality of viewpoints, the display image generator comprising an active matrix type display panel,
the active matrix type display panel being designed such that each region surrounded by gate lines and source lines includes a pixel, the pixel includes auxiliary capacity wiring comprising an auxiliary capacitor, the auxiliary capacity wiring comprising a narrower line width at an intersection with a source line than a line width in a pixel pattern, a direction in which the display image is separated according to a plurality of viewpoints is a lateral direction, the source lines extend in a longitudinal direction, and
a light shielding film is provided to avoid light entering aperture sections positioned between the auxiliary capacity wiring and the source line.

6. The display panel according to claim 5, wherein the width of the aperture sections shielded by the light-shielding film is set to satisfy the following inequality:

$$2 \, \mu m < \text{(minimum width of the aperture sections in the pixel)} < 7 \, \mu m.$$

7. A display panel comprising:
a display image generator configured to generate a display image according to inputted display data, the display image generator comprising an active matrix type display panel, the active matrix type display panel comprising:
signal lines;
auxiliary capacitors; and
aperture sections provided between the signal lines and the auxiliary capacitors; and
a display image separator configured to separate the display image according to a plurality of viewpoints; and
wherein a parameter of the aperture sections is chosen to maintain, below a predetermined crosstalk value, any crosstalk caused by diffraction of light which has passed through the display image separator and into the aperture sections.

8. The display panel of claim 7, wherein the parameter is width of the aperture sections.

9. The display panel of claim 7, wherein the width is chosen not to be in a range of more than 2 μM and less than 7 μm.

10. The display panel of claim 7, wherein the predetermined crosstalk value is 5.6.

11. A display panel comprising:
a display image generator configured to generate a display image according to inputted display data, the display image generator comprising an active matrix type display panel, the active matrix type display panel comprising:
signal lines;
auxiliary capacitors; and
auxiliary capacity lines extending essentially orthogonally to the signal lines and connecting to the auxiliary capacitors;
aperture sections provided between the signal lines, the auxiliary capacity lines, and the auxiliary capacitors; and
a display image separator configured to separate the display image according to a plurality of viewpoints; and
wherein a parameter of the auxiliary capacity lines is chosen to control negative capacitance and thereby to maintain, below a predetermined crosstalk value, any crosstalk caused by diffraction of light which has passed through the display image separator and into the aperture sections.

12. The display panel of claim 11, wherein the parameter is width of the auxiliary capacity lines at an intersection of the auxiliary capacity lines and the signal lines.

13. The display of claim 11, wherein the parameter is area of the auxiliary capacity lines at an intersection of the auxiliary capacity lines and the signal lines.

14. A display panel comprising:
a display image generator configured to generate a display image according to inputted display data, the display image generator comprising an active matrix type display panel, the active matrix type display panel comprising:
signal lines;

auxiliary capacitors; and aperture sections provided between the signal lines and the auxiliary capacitors; and a display image separator configured to separate the display image according to a plurality of viewpoints; and a shield configured to block potential crosstalk-causing diffraction rays which have passed through the display image separator and into the aperture sections.

* * * * *